United States Patent
Woollen et al.

(10) Patent No.: US 7,506,308 B2
(45) Date of Patent: Mar. 17, 2009

(54) SYSTEM AND METHOD FOR USING A SPLIT-DIRECTORY STRUCTURE FOR SOFTWARE DEVELOPMENT

(75) Inventors: Rob Woollen, San Francisco, CA (US); Mark Griffith, Pleasant Hill, CA (US)

(73) Assignee: Bea Systems, Inc., San Jose, CA (US)

( * ) Notice: Subject to any disclaimer, the term of this patent is extended or adjusted under 35 U.S.C. 154(b) by 495 days.

(21) Appl. No.: 10/786,748

(22) Filed: Feb. 25, 2004

(65) Prior Publication Data

US 2004/0172619 A1 Sep. 2, 2004

Related U.S. Application Data

(60) Provisional application No. 60/450,781, filed on Feb. 28, 2003.

(51) Int. Cl.
G06F 9/44 (2006.01)
G06F 15/16 (2006.01)

(52) U.S. Cl. .................. 717/120; 717/145; 717/175; 717/176; 709/217

(58) Field of Classification Search .................. 717/120
See application file for complete search history.

(56) References Cited

U.S. PATENT DOCUMENTS

| | | | |
|---|---|---|---|
| 5,361,357 A | 11/1994 | Kionka | ........................ 395/700 |
| 5,634,124 A | 5/1997 | Khoyi et al. | |
| 5,812,849 A | 9/1998 | Nykiel et al. | |
| 5,999,741 A | 12/1999 | May et al. | |
| 6,003,042 A | 12/1999 | Melahn | |
| 6,023,271 A | 2/2000 | Quaeler-Bock et al. | |
| 6,064,382 A | 5/2000 | Diedrich et al. | |
| 6,112,024 A | 8/2000 | Almond et al. | |
| 6,178,546 B1 | 1/2001 | McIntyre | ........................ 717/3 |
| 6,202,207 B1 | 3/2001 | Donohue | |
| 6,301,590 B1 | 10/2001 | Siow et al. | |
| 6,473,894 B1 | 10/2002 | Shrader et al. | |
| 6,779,177 B1 | 8/2004 | Bahrs et al. | |
| 6,892,382 B1 * | 5/2005 | Hapner et al. | ................ 717/174 |
| 6,986,135 B2 | 1/2006 | Leathers et al. | |
| 2002/0178439 A1 | 11/2002 | Rich et al. | |
| 2003/0014740 A1 * | 1/2003 | Aubertine | .................... 717/154 |
| 2003/0101245 A1 * | 5/2003 | Srinivasan et al. | .......... 709/221 |
| 2003/0182652 A1 * | 9/2003 | Custodio | .................... 717/122 |
| 2003/0188036 A1 | 10/2003 | Chen et al. | |
| 2003/0200532 A1 | 10/2003 | Gensel | |
| 2003/0229888 A1 | 12/2003 | Spotswood et al. | |
| 2004/0088681 A1 | 5/2004 | Berg et al. | |

* cited by examiner

*Primary Examiner*—Tuan Dam
*Assistant Examiner*—Michael Yigdall
(74) *Attorney, Agent, or Firm*—Fliesler Meyer LLP

(57) ABSTRACT

A development-oriented directory structure that can be used with an application server, and which solves a number of the problems associated with traditional Enterprise Archive (EAR) files. The directory structure comprises a source folder that stores source files for use with or as part of a software application; and an output folder that stores compiled files for use with or as part of the software application. The source folder and the output folder output folder form a split directory which is then used in deploying the software application.

30 Claims, 1 Drawing Sheet

SYSTEM AND METHOD FOR USING A SPLIT-DIRECTORY STRUCTURE FOR SOFTWARE DEVELOPMENT

CLAIM OF PRIORITY

This application claims priority to U.S. Provisional Patent Application 60/450,781, filed Feb. 28, 2003 entitled "SYSTEM AND METHOD FOR USING A SPLIT-DIRECTORY STRUCTURE FOR SOFTWARE DEVELOPMENT" which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to software development, and particularly to a system and method for using a split-directory structure for software development.

BACKGROUND

The JAVA 2 ENTERPRISE EDITION (J2EE) specification defines the ENTERPRISE ARCHIVE (EAR) file as a standard structure for developing and packaging J2EE applications. EARs are useful for application development, in that the application may, for example, include both a Web application (Webapp) and an ENTERPRISE JAVABEAN (EJB), which will be packaged into the EAR. However, while this works well for completed applications, it isn't very convenient for application development.

In a typical application server development environment that uses EARs, a structure similar to that shown in FIG. 1 is often used. As shown in FIG. 1, the directories for the /myapp application include, for example, a /myejb subdirectory, for storing both ejb source files and XML descriptors. Similarly /myapp may include a /webapp directory, for storing JSPs, html files, and images, etc. All of this code is stored in the source control system for use by the developer in building the application.

To deploy the application, a number of steps must be performed, namely compiling the JAVA files, generating any servlets or container classes, and packaging the whole lot in an EAR. The EAR adheres to a format wherein the top level includes an EAR descriptor IMETA-INF/application.xml, and all of the other components are listed underneath. This approach works well when the application has been fully completed and ready for installation in the production environment. However it's less useful for application development.

A problem with the traditional approach is that the developer will have both source files and system-generated output in the same directory. This can be confusing. It's also hard to generate a clean build of the application since it's difficult to delete only the system-generated files. A mechanism that allows application development while maintaining some separation between the user-coded and system-generated files would be useful in addressing these problems.

SUMMARY

An embodiment of the invention provides a development-oriented directory structure that can be used with an application server and which solves a number of the problems associated with traditional Enterprise Archive (EAR) files. The development-oriented directory structure avoids the copying of files during the build process, and presents a clean separation between human-readable source files stored in a source control system and generated java class files. The two directories (source and output) appear like a single application.

The terms JAVA, JAVA 2 ENTERPRISE EDITION (J2EE), ENTERPRISE JAVA BEAN (EJB), and JAVA SERVLET PAGE (JSP), are trademarks of Sun Microsystems, Inc. The terms WEBLOGIC, and WEBLOGIC SERVER, are trademarks of SEA Systems, Inc.

DETAILED DESCRIPTION

An embodiment of the invention provides a development-oriented directory structure that can be used with an application server (for example the WEBLOGIC SERVER from BEA Systems, Inc.). and which solves a number of the problems associated with traditional ENTERPRISE ARCHIVE (EAR) files. The development-oriented directory structure avoids the copying of files during the build process, and presents a clean separation between human-readable source files stored in a source control system and generated JAVA class files. The two directories (source and output) appear like a single application.

In a traditional software development system, use is made of a separate source directory (/source) for storing source code, typically under management or control of a source control system, and a build directory (/build) into which Java files, etc, are compiled. Each time a change is made to a small portion of the code, it's necessary to do a full redeployment. The server receiving the build only sees the /build directory, and not the /source directory. Besides being inelegant, this approach prevents the use of Web-editing-in-place of the source code so as to immediately see the effect of changes to the underlying source.

The solution provided by an embodiment of the invention is to provide a split-directory structure, and modify the server so that it can see both the /source and the /build directories.

Figure 1:
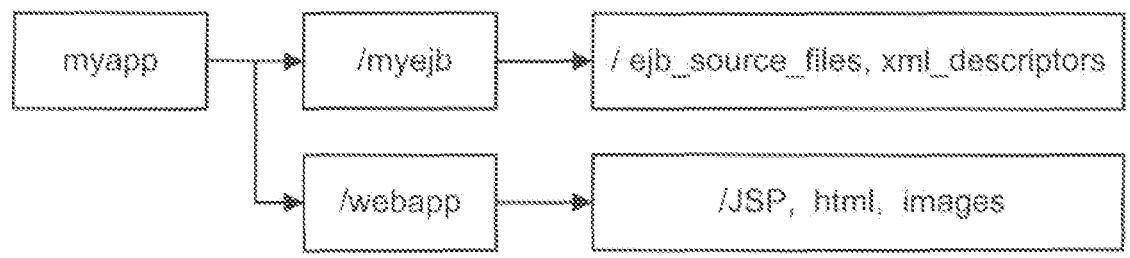
FIG. 1 shows an illustration of a directory structure used to store files for building an application.
Figure 2:
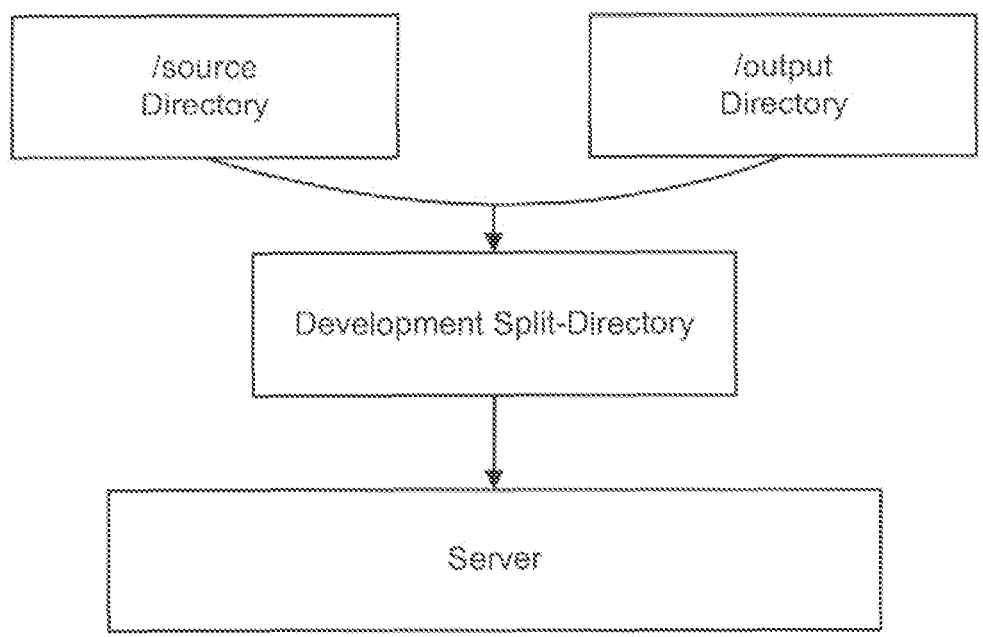
FIG. 2 shows an illustration of a development split directory structure in accordance with an embodiment of the invention.

FIG. 2 illustrates an example of a development split-directory structure in accordance with an embodiment of the invention, as it may be interpreted by a server. As shown in FIG. 2, the /source and /output directories are interpreted as a single directory. This approach requires no copying, in that the server can read source files (e.g. JSP's, XML descriptors, html images, etc.) directly from the split directory structure, without having to copy them to a /build directory. Everything that is generated goes into an /output directory. The benefit to this approach is that, since the server looks at both the directories, the developer can change the source files and the server will see the updates.

Implementation Detail

The split-directory system provides a recommended directory layout and an accompanying set of ant tasks for building and deploying applications. The split-directory differs from traditional EAR files because it is optimized for iterative development. Instead of a single archived EAR file or an "exploded" EAR directory structure, the split-directory has 2 parallel directories. The source directory contains all of the source files e.g. JAVA files, descriptors, JSP flies, HTML etc in a traditional EAR-like directory structure. All generated or compiled classes are stored in a separate output directory. This arrangement produces several advantages over the traditional exploded EAR file:

1. No need for file copying.
2. Web files can be changed and redeployed in place without rebuilding.
3. Clean separation between source and generated files allows cleaning the build by just removing the output directory.

Server Support for Split-Directory

The user specifies the output directory when deploying the application to the server. The server automatically recognizes the deployment as a split-directory and uses information in the output directory to locate the source directory. The Server views the application as a union of the source and output directories. When the server searches for a resource or class, it first checks the source directory. If the class or resource is not found, it then checks the output directory.

When the application is finally deployed, the split-directory appears just as it did using traditional source control. In accordance with one embodiment, the output directory includes a file (build.txt, or in some instances referred to as .beabuild.txt)the content of which indicates that the output directory is in fact an output directory of a corresponding source directory. In this way, other application can be pointed to the appropriate output directory and can still access the source directory when necessary.

In accordance with one embodiment, the split directory feature can be provided through an abstraction in the server called a virtual JAR file. The virtual JAR file provides an abstraction over the two split directories. When a request is made to the JAR to retrieve e.g. a/b.jar, the virtual JAR checks the /source directory, then checks the /output directory.

Ant Tasks wlcompile wlcompile is the main build task which compiles the application's JAVA files. wlcompile begins by analyzing all of the components and determining their type. It treats components as either EJBs, Web applications, or JAVA components. JAVA components are compiled first into the output directory/APP-INF/classes so they will be visible throughout the application. Next, wlcompile builds the EJBs and automatically includes the previously built JAVA components in the compiler's classpath. This allows the EJB components to call the JAVA components without requiring the user to manually edit their classpath. Finally the java files in the webapp are compiled with the EJB components and JAVA components in the compiler's classpath. This allows the Web Applications to refer to the EJB and application JAVA classes without manually editing the classpath. The following example compiles the application with sources in /acme/myapp to output directory /build/myapp:

```
<wlcompile srcdir="/acme/myapp" destdir="/build/myapp" />
```

By default wlcompile builds the entire application. It is also possible to instruct wlcompile to build a single component. This is especially useful when developing large applications where the developer is making isolated changes and wants a faster build. When wlcompile builds a single component, it only rebuilds that component. wlcompile does not track dependencies between components so it will not rebuild any other components which depend on the rebuilt component. The following example builds only the AcmeEJB component:

```
<wlcompile srcdir="/acme/myapp" destdir="/build/myapp"
    includes="AcmeEJB" />
```

As shown in the example above, wlcompile automatically guesses the type of each component in the application. In general, this guessing works well, but in some cases, especially when components are incomplete, wlcompile cannot accurately determine the type.

The common case where wlcompile fails is when an EJB is being developed. Users will typically compile their java files first, get this working, and then write their deployment descriptors. wlcompile is unable to determine that this component is an EJB when it does not have descriptors yet. wlcompile allows users to specify a component's type in cases where the guessing is not correct. The following example builds only the AcmeEJB component and hardcodes it to be an EJB:

```
<wlcompile srcdir="/acme/myapp" destdir="/build/myapp">
    <component name="AcmeEJB" type="EJB" />
</wlcompile>
```

Exclude lists may also be specified, so as to build everything but a few portions of the application.

wldeploy

```
<wldeploy user="system" password="gumby1234"
    action="deploy" source="/build/myapp" />
``` wlpackage

The following examples package split-directory myapp as a traditional EAR file:

```
<wlpackage toFile="/acme/App.ear" srcdir="/acme/myapp"
    destdir="/build/myapp" />
<wlpackage toDir="/acme/explodedEar" srcdir="/acme/myapp"
    destdir="/build/myapp" />
```

Split Directory Recipes

Stand-alone Webapp

```
AcmeWeb/WEB-INF/web.xml
AcmeWeb/WEB-INF/weblogic.xml
AcmeWeb/WEB-INF/src/com/acme/web/MyServlet.java
AcmeWeb/login.jsp
AcmeWeb/graphics/logo.jpg
```

The webapp source is contained within a directory (AcmeWeb). As usual, the descriptors are in the WEB-INF directory. The WEB-INF/src directory is a place for java classes such as servlets which will be compiled to the WEB-INF/classes directory. JSP files, HTML, and other web files are contained under the directory root.

Stand-alone Ejbapp

```
AcmeEJB/META-INF/ejb-jar.xml
AcmeEJB/META-INF/weblogic-ejb-jar.xml
AcmeEJB/com/acme/ejb/MyLocal.java
AcmeEJB/com/acme/ejb/MyHome.java
AcmeEJB/com/acme/ejb/MyEJB.java
```

The ejbapp source is contained within a directory (AcmeEJB). As usual, the descriptors are in the META-INF directory. Any JAVA files under the AcmeEJB root directory are compiled into the output directory.

Application with Webapp and Ejb

```
InventoryApp/META-INF/application.xml
InventoryApp/META-INF/weblogic-application.xml
InventoryApp/AcmeEJB/META-INF/ejb-jar.xml
InventoryApp/AcmeEJB/META-INF/weblogic-ejb-jar.xml
InventoryApp/AcmeEJB/com/acme/ejb/MyLocal.java
InventoryApp/AcmeEJB/com/acme/ejb/MyHome.java
InventoryApp/AcmeEJB/com/acme/ejb/MyEJB.java
InventoryApp/AcmeWeb/WEB-INF/web.xml
InventoryApp/AcmeWeb/WEB-INF/weblogic.xml
InventoryApp/AcmeWeb/WEB-INF/src/com/acme/web/MyServlet.java
InventoryApp/AcmeWeb/login.jsp
InventoryApp/AcmeWeb/graphics/logo.jpg
```

This example shows an Inventory application which is made up of an EJB (AcmeEJB) and a webapp (AcmeWeb). The application's descriptors are contained in the META-INF/directory as usual. The application components, AcmeEJB and AcmeWeb, are contained in directories directly under the InventoryApp.

Third-Party Jar Files

```
InventoryApp/APP-INF/lib/xmlparser.jar
InventoryApp/APP-INF/lib/customlib.jar
```

This example demonstrates how the Inventory Application can be extended to use third-party jar files. Third-party jar files are jar files that are packaged with the application, but are usually not the develoer's own code, and are not recompiled. For instance, XML parsers, logging implementations, and other utility jar files are common. These files may be placed in the APP-INF/lib/subdirectory. They will be visible throughout the application.

Java Utility Classes

```
InventoryApp/AcmeMainframe/com/acme/mainframe/Connect.java
InventoryApp/AcmeMainframe/com/acme/mainframe/Login.java
InventoryApp/AcmeDebug/com/acme/debug/Tracer.java
```

This example demonstrates how the Inventory Application can be extended to use JAVA utility classes. JAVA Utility classes differ from third-party jars because the source files are part of the application and must be compiled. JAVA Utility classes are typically libraries used by application components such as EJBs or webapps. The build process compiles these files into the APP-INF/classes directory under the output directory. These classes are avaliable throughout the application.

EJB Using EJBGen

```
AcmeEJB/com/acme/ejb/MyEJB.ejb
AcmeEJB/com/acme/ejb/SupportingClass.java
```

The ejbapp source is contained within a directory (AcmeEJB). The EJBGen source file must have a .ejb extension. The build system runs EJBGen on this file creating the java sources and descriptors in the output directory. Any java files in the source directory will be compiled as usual to the output directory.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the split directory feature may be used in a WebLogic environment, other application servers, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for organization of software application files during development and subsequent deployment of the software application to a server, comprising:

a split directory structure stored on a computer medium that stores files for a software application, wherein, for each software application, the split directory structure includes both a source folder that stores editable source files as part of the software application, and a corresponding output folder that stores system-generated compiled versions of the source files as part of the software application, together with a build file that indicates the output folder as being an output of its corresponding source folder, and wherein the split directory is accessed as a virtual file that provides an abstraction over the two folders therein, so that the two folders appear to a server as a single application;

a server upon which the software application will be deployed; and a deployment tool that allows a user to specify the output folder during deployment of the software application, wherein during the deployment of an application class or resource the server interprets the software application as a union of both the source folder and the output folder, recognizes the split directory structure, parses the build file to determine the corresponding source folder, and deploys the application by making requests to the virtual file which checks first the source folder for the class or resource, and then the corresponding output folder for that class or resource, before deploying the software application files to the server.

2. The system of claim 1 wherein the output folder includes a file that identifies the output folder as being part of the split directory which also includes the corresponding source folder.

3. The system of claim 1 wherein said software application, or another software application can point to the output folder to access or retrieve resources in either the output folder and/or the source folder as necessary for operation of the software application.

4. The system of claim 1 wherein said output folder is automatically created and populated upon compiling the software application.

5. The system of claim 1 wherein said output folder can be deleted to remove the latest build of the software application, and then recreated to create a new build.

6. The system of claim 1 wherein the source folder is populated with source files that are stored in or retrieved from a source control system.

7. The system of claim 1 wherein the virtual file first checks the source folder for the software application files including any classes or resources needed by the software application, and, if the classes or resources are not found in the source folder, then checks the output folder.

8. The system of claim 1 wherein the source folder includes JAVA files from a source control system, and wherein the output folder includes generated JAVA class files, and wherein when the server searches for a resource or class for use in deploying the software application, it first checks the source folder, and if the class or resource is not found, then checks the output folder.

9. The system of claim 1 wherein the system comprises a different split directory structure and corresponding virtual file for each software application to be deployed to the server.

10. The system of claim 1 wherein source files can be modified by the user and then stored in the source folder, and wherein the server automatically sees the new source files and uses them as necessary in deploying the software application.

11. A method for deploying a software application to a server, comprising the steps of:

storing files for a software application in a split directory structure on a computer medium, wherein, for each software application, the split directory structure includes both a source folder that stores editable source files as part of the software application, and a corresponding output folder that stores system-generated compiled versions of the source files as part of the software application, together with a build file that indicates the output folder as being an output of its corresponding source folder, and wherein the split directory is accessed as a virtual file that provides an abstraction over the two folders therein, so that the two folders appear to a server as a single application; and allowing the user to specify the output folder during deployment of an application class or resource of the software application to the server, wherein during the deployment the server interprets the software application as a union of both the source folder and the output folder, parses the build file to determine the corresponding source folder, recognizes the split directory structure by making requests to the virtual file which checks first the source folder for the class or resource, and then the corresponding output folder for that class or resource, and deploys the software application files to the server.

12. The method of claim 11 wherein the out put folder includes a file that identifies the output folder as being part of the split directory which also includes the corresponding source folder.

13. The method of claim 11 wherein said software application, or another software application can point to the output folder to access or retrieve resources in either the output folder and/or the source folder as necessary for operation of the software application.

14. The method of claim 11 wherein said output folder is automatically created and populated upon compiling the software application.

15. The method of claim 11 wherein said output folder can be deleted to remove the latest build of the software application, and then recreated to create a new build.

16. The method of claim 11 wherein the source folder is populated with source files that are stored in or retrieved from a source, control system.

17. The method of claim 11 wherein the virtual file first checks the source folder for the software application files including any classes or resources needed by the software application, and, if the classes or resources are not found in the source folder, then checks the output folder.

18. The method of claim 11 wherein the source folder includes JAVA files from a source control system, and wherein the output folder includes generated JAVA class files, and wherein when the server searches for a resource or class for use in deploying the software application, it first checks the source folder, and if the class or resource is not found, then checks the output folder.

19. The method of claim 11 wherein the method comprises using a different split directory structure and corresponding virtual file for each software application to be deployed to the server.

20. The method of claim 11 wherein source files can be modified by the user and then stored in the source folder, and wherein the server automatically sees the new source files and uses them as necessary in deploying the software application.

21. A computer readable medium including instructions stored thereon which when executed cause the computer to perform the steps of:

storing files for a software application in a split directory structure on a computer medium, wherein, for each software application, the split directory structure includes born a source folder that stores editable source files as part of the software application, and a corresponding output folder that stores system-generated compiled versions of the source files as part of the software application, together with a build file that indicates the output folder as being an output of its corresponding source folder, and wherein the split directory is accessed as a virtual file that provides an abstraction over the two folders therein, so that the two folders appear to a server as a single application;

allowing the user to specify the output folder during deployment of an application class or resource of the software application to the server;

interpreting the software application as a union of both the source folder and the output folder, parsing the build file to determine the corresponding source folder, and recognizing the split directory structure by making requests to the virtual file which checks first the source folder for the class or resource, and then the corresponding output folder for that class or resource; and deploying the software application files to the server.

22. The computer readable medium of claim 21 wherein the output folder includes a file that identifies the output folder as being part of the split directory which also includes the corresponding source folder.

23. The computer readable medium of claim 21 wherein said software application, or another software application can point to the output folder to access or retrieve resources in either the output folder and/or the source folder as necessary for operation of the software application.

24. The computer readable medium of claim 21 wherein said output folder is automatically created and populated upon compiling the software application.

25. The computer readable medium of claim 21 wherein said output folder can be deleted to remove the latest build of the software application, and then recreated to create a new build.

26. The computer readable medium of claim 21 wherein the source folder is populated with source files that are stored in or retrieved from a source control system.

27. The computer readable medium of claim 21 wherein the virtual file first checks the source folder for the software application files including any classes or resources needed by the software application, and, if the classes or resources are not found in the source folder, then checks the output folder.

28. The computer readable medium of claim 21 wherein the source folder includes JAVA files from a source control system, and wherein the output folder includes generated JAVA class files, and wherein when the server searches for a resource or class for use in deploying the software application, it first checks the source folder, and if the class or resource is not found, then checks the output folder.

29. The computer readable medium of claim 21 wherein the steps comprise using a different split directory structure and corresponding virtual file for each software application to be deployed to the server.

30. The computer readable medium of claim 21 wherein source files can be modified by the user and then stored in the source folder, and wherein the server automatically sees the new source files and uses them as necessary in deploying the software application.

* * * * *

UNITED STATES PATENT AND TRADEMARK OFFICE
CERTIFICATE OF CORRECTION

| | | |
|---|---|---|
| PATENT NO. | : 7,506,308 B2 | |
| APPLICATION NO. | : 10/786748 | |
| DATED | : March 17, 2009 | |
| INVENTOR(S) | : Woollen et al. | |

It is certified that error appears in the above-identified patent and that said Letters Patent is hereby corrected as shown below:

On the Title Pg, Item (57), under "Abstract", line 8, before "form" delete "output folder".

In column 1, line 54, delete "IMETA" and insert -- /META --, therefor.

In column 2, line 17, delete "SEA" and insert -- BEA --, therefor.

In column 2, line 33, delete "Inc.")." and insert -- Inc.), --, therefor.

In column 3, line 9, delete "flies," and insert -- files, --, therefor.

In column 6, line 16, delete "avaliable" and insert -- available --, therefor.

In column 8, line 22, in Claim 11, delete "server," and insert -- server; --, therefor.

In column 8, line 49, in Claim 16, delete "source," and insert -- source --, therefor.

In column 9, line 9, in Claim 21, delete "born" and insert -- both --, therefor.

Signed and Sealed this

Eighteenth Day of May, 2010

David J. Kappos
*Director of the United States Patent and Trademark Office*